(12) United States Patent
Astely et al.

(10) Patent No.: US 9,369,238 B2
(45) Date of Patent: Jun. 14, 2016

(54) METHOD AND ARRANGEMENT IN A COMMUNICATION SYSTEM

(75) Inventors: David Astely, Bromma (SE); Daniel Larsson, Solna (SE)

(73) Assignee: Telefonaktiebolaget L M Ericsson (publ), Stockholm (SE)

(*) Notice: Subject to any disclaimer, the term of this patent is extended or adjusted under 35 U.S.C. 154(b) by 1071 days.

(21) Appl. No.: 13/058,474

(22) PCT Filed: Feb. 18, 2009

(86) PCT No.: PCT/SE2009/050177
§ 371 (c)(1),
(2), (4) Date: Apr. 7, 2011

(87) PCT Pub. No.: WO2010/019088
PCT Pub. Date: Feb. 18, 2010

(65) Prior Publication Data
US 2011/0176443 A1   Jul. 21, 2011

Related U.S. Application Data

(60) Provisional application No. 61/088,067, filed on Aug. 12, 2008.

(51) Int. Cl.
*H04L 12/28* (2006.01)
*H04L 1/16* (2006.01)
(Continued)

(52) U.S. Cl.
CPC .............. *H04L 1/1607* (2013.01); *H04L 1/009* (2013.01); *H04L 1/1642* (2013.01); *H04L 1/1861* (2013.01); *H04W 74/004* (2013.01)

(58) Field of Classification Search
CPC .............. H04B 1/70735; H04B 17/24; H04W 72/0406; H04W 74/0833; H04W 72/1284; H04W 48/12; H04W 72/1231; H04L 1/1671; H04L 1/1812; H04L 5/0055; H04L 5/006; H04L 1/0073; H04L 1/0003; H04L 1/0009; H04J 13/12

USPC ................. 370/252, 335, 328, 268, 498, 329; 455/452.2; 380/268; 375/298; 714/807, 714/749
See application file for complete search history.

(56) References Cited

U.S. PATENT DOCUMENTS 7,818,647 B2   10/2010  Lohr et al.
2004/0258096 A1*  12/2004  Yoon et al. .................... 370/498
(Continued)

FOREIGN PATENT DOCUMENTS

JP    2007166642 A    6/2007
JP    2007522715 A    8/2007
(Continued)

OTHER PUBLICATIONS

Ericsson, "Details of ACK/NAK bundling for TDD", TSG-RAN WG1 #52bis, Shenzhen, China, Mar. 31-Apr. 4, 2008.
(Continued)

*Primary Examiner* — Wei Zhao
*Assistant Examiner* — Lionel Preval
(74) *Attorney, Agent, or Firm* — Coats & Bennett, P.L.L.C.

(57) ABSTRACT

A terminal is configured to receive data packets from a base station and provide feedback to the base station. The feedback concerns the reception status of the received data packets and may comprise an ACK/NAK. A method in the terminal comprises receiving and decoding data packets from the base station in a subframe. It is further established whether any data packet within the received subframe is not correctly received and detected whether any subframe, expected to be received, has been missed. Further, acknowledgement information ACK/NAK is generated, and a scrambling code is selected with which the ACK/NAK is scrambled. The scrambled ACK/NAK is then sent to the base station, concerning the reception status of the data packets within the received subframes.

18 Claims, 11 Drawing Sheets

(51) Int. Cl.
*H04L 1/00* (2006.01)
*H04L 1/18* (2006.01)
*H04W 74/00* (2009.01)

(56) References Cited

U.S. PATENT DOCUMENTS

| | | | |
|---|---|---|---|
| 2004/0264420 A1* | 12/2004 | Qian et al. | 370/335 |
| 2007/0183451 A1 | 8/2007 | Lohr et al. | |
| 2008/0137605 A1 | 6/2008 | Berg | |
| 2009/0129317 A1* | 5/2009 | Che et al. | 370/328 |
| 2009/0136034 A1* | 5/2009 | Gaal et al. | 380/268 |
| 2009/0143074 A1* | 6/2009 | Pelletier et al. | 455/452.2 |
| 2009/0175225 A1* | 7/2009 | Bi et al. | 370/329 |
| 2009/0241004 A1* | 9/2009 | Ahn | H04L 1/1812 714/749 |
| 2009/0245421 A1* | 10/2009 | Montojo et al. | 375/298 |
| 2009/0258600 A1* | 10/2009 | Nishio | H04L 1/0026 455/67.11 |
| 2012/0113925 A1* | 5/2012 | Ahn et al. | 370/329 |
| 2013/0326320 A1* | 12/2013 | Li et al. | 714/807 |

FOREIGN PATENT DOCUMENTS

| | | |
|---|---|---|
| JP | 2008289114 A | 11/2008 |
| WO | 2008093644 A1 | 8/2008 |

OTHER PUBLICATIONS

LG Electronics, "Bundled ACK/NACK in TDD", 3GPP TSG RAN WG1#53, Kansas City, USA, R1-081815, May 5-9, 2008.

Huawei, "Consideration on ACK/NACK bundling and Mutli-ACK/NACK multiplexing in TDD", 3GPP TSG-RAN-WG1 Meeting #53, Kansas City, MO, USA, R1-081790, May 5-9, 2008.

3rd Generation Partnership Project. "Evaluating Point-to-Point Bearer for Single-Cell MBMS Transmission." 3GPP TSG RAN WG2 #54, R2-062445, Tallinn, Estonia, Aug. 28-Sep. 1, 2006.

3rd Generation Partnership Project. 3GPP TS 36.211, V8.3.0 (May 2008). 3rd Generation Partnership Project; Technical Specification Group Radio Access Network; Evolved Universal Terrestrial Radio Access (E-UTRA); Physical Channels and Modulation (Release 8). May 2008, pp. 1-15.

Nortel. "The detection of the antenna configuration." 3GPP TSG-RAN WG1 Meeting #50, R1-073309, Athens, Greece, Aug. 20-24, 2007, pp. 1-10.

* cited by examiner 0.5ms slot subframe (7 symbols)

1ms subframe (14 symbols)

Fig. 1h

METHOD AND ARRANGEMENT IN A COMMUNICATION SYSTEM

TECHNICAL FIELD

The present invention relates to a method and an arrangement in a base station and a method and an arrangement in a mobile terminal. In particular, it relates to the provision of acknowledgement feedback to a base station, concerning the reception status of data packets previously received from the base station.

BACKGROUND

A key requirement on Long Term Evolution (LTE) in 3GPP Wireless Communications Systems is frequency flexibility for transmissions between a radio base station and a mobile terminal over a radio link. For this purpose, carrier bandwidths between 1.4 MHz and 20 MHz are supported, as is both Frequency Division Duplex (FDD) and Time Division Duplex (TDD), so that both paired and unpaired frequency spectrum can be used. For FDD, the downlink, i.e. the link from a base station to a mobile terminal, and uplink, i.e. the link from a mobile terminal to a base station, use different frequencies so called "paired frequency spectrum" and can hence transmit simultaneously. For TDD, uplink and downlink use the same frequency "unpaired frequency spectrum" and cannot transmit simultaneously. Uplink and downlink can however share the time in a flexible way, and by allocating different amounts of time, such as the number of subframes of a radio frame, to uplink and downlink, it is possible to adapt to asymmetric traffic and resource needs in uplink and downlink.

The above asymmetry also leads to a significant difference between FDD and TDD. Whereas for FDD, the same number of uplink and downlink subframes is available during a radio frame, for TDD the number of uplink and downlink subframes may be different. In LTE time is structured into radio frames of 10 ms duration, and each radio frame is further divided into 10 subframes of 1 ms each. One of many consequences of this is that in FDD, a mobile terminal can always send feedback in response to a data packet in an uplink subframe subject to a certain fixed processing delay. In other words, every downlink subframe can be associated to a specific later uplink subframe for feedback generation in way that this association is one-to-one, i.e. to each uplink subframe is associated exactly one downlink subframe. For TDD however, since the number of uplink and downlink subframes during a radio frame may be different, it is in general not possible to construct such one-to-one association. For the typical case with more downlink subframes than uplink subframes, it is rather so that feedback from several downlink subframes requires to be transmitted in each uplink subframe.

In LTE, a radio frame of 10 ms duration is divided into ten subframes, wherein each subframe is 1 ms long. In case of TDD, a subframe is either assigned to uplink or downlink, i.e. uplink and downlink transmission cannot occur at the same time. Furthermore, each 10 ms radio frame is divided into two half-frames of 5 ms duration where each half-frame consists of five subframes as shown in FIG. 1a.

The first subframe of a radio frame is always allocated to downlink transmission. The second subframe is split into three special fields, Downlink Pilot Time Slot (DwPTS), Guard Period (GP) and Uplink Pilot Time Slot (UpPTS), with a total duration of 1 ms.

UpPTS is used for uplink transmission of sounding reference signals and, if so configured, reception of a shorter random access preamble. No data or control signaling can be transmitted in UpPTS.

GP is used to create a guard period between periods of downlink and uplink subframes and may be configured to have different lengths in order to avoid interference between uplink and downlink transmissions and is typically chosen based on the supported cell radius. Thus a large cell may benefit from a longer guard period as the signal propagation time becomes longer for signals sent over longer distances.

DwPTS is used for downlink transmission much like any other downlink subframe with the difference that it has shorter duration.

Different allocations of the remaining subframes to uplink and downlink transmission are supported, both allocations with 5 ms periodicity in which the first and second half-frame have identical structure, and allocations with 10 ms periodicity for which the half-frames are organized differently. For certain configurations, the entire second half-frame is assigned to downlink transmission. Currently supported configurations use 5 ms periodicity as illustrated in FIG. 1b and 10 ms periodicity as depicted in FIG. 1c. In case of 5 ms periodicity, the ratio between downlink and uplink may e.g. be 2/3, 3/2, 4/1, etc. In case of 10 ms periodicity, the ratio between downlink and uplink may e.g. be 5/5, 7/3, 8/2, 9/1 etc.

In the downlink of LTE, Orthogonal Frequency Division Multiplex (OFDM) with a subcarrier spacing of 15 kHz is used. In the frequency dimension the subcarriers are grouped into resource blocks, each containing twelve consecutive subcarriers. The number of resource blocks depends on the system bandwidth, and the minimum bandwidth corresponds to six resource blocks. Depending on the configured cyclic prefix length, a 1 ms subframe contains either 12 or 14 OFDM symbols in time. The term resource block is also used to refer to the two-dimensional structure of all OFDM symbols within a half subframe. The special downlink subframe DwPTS has a variable duration, and can assume lengths of 3, 9, 10, 11 or 12 OFDM symbols for the case with normal cyclic prefix, and 3, 8, 9 or 10 symbols for the case with extended cyclic prefix.

In the uplink of LTE, Single-Carrier Frequency-Division Multiple Access (SC-FDMA), also referred to as Discrete Fourier Transform (DFT)-pre-coded OFDM is used. The underlying two-dimensional (time and frequency) numerology is the same in terms of subcarrier spacing, cyclic prefix lengths and number of OFDM symbols. The major difference is that modulated data symbols to be transmitted in certain OFDM symbols are subject to a DFT and the outputs of the DFT are mapped to the subcarriers.

In order to improve performance of transmission in both the downlink and uplink direction, LTE uses Hybrid Automatic Repeat Request (HARQ). The basic idea of HARQ, for downlink transmission, is that after receiving data in a downlink subframe the terminal attempts to decode it and then reports to the base station whether the decoding was successful by sending an acknowledgement (ACK) or unsuccessful by sending a negative acknowledgement (NAK). In the latter case of an unsuccessful decoding attempt, the base station thus receives a NAK in a later uplink subframe, and can retransmit the erroneously received data.

Downlink transmissions are dynamically scheduled, i.e. in each subframe the base station transmits control information on which terminals are to receive data and upon which resources in the current downlink subframe. Such a control information message to a terminal is referred to as a downlink assignment. A downlink assignment thus contains information to the terminal about in which resources a subsequent data will be sent, and also information necessary for the terminal to decode the subsequent data, such as modulation and coding scheme. By resources is here meant some set of resource blocks. This control signaling is transmitted in the first 1, 2 or 3 OFDM symbols in each subframe. The data sent to a terminal in a single downlink subframe is often referred to as a transport block.

A terminal may thus listen to the control channel, and if it detects a downlink assignment addressed to itself, it may try to decode the subsequent data. It may also generate feedback in response to the transmission, in the form of an ACK or a NAK depending on whether the data was decoded correctly or not. Furthermore, from the control channel resources on which the assignment was transmitted by the base station, the terminal may determine the corresponding uplink control channel resource.

For LTE FDD the terminal may in response to a detected downlink assignment in subframe n, send an ACK/NAK report in uplink subframe n+4. For the case with so-called Multiple In Multiple Out (MIMO) multi-layer transmission, two transport blocks are transmitted in a single downlink subframe, and the terminal will respond with two ACK/NAK reports in the corresponding uplink subframe.

The assignment of resources to the terminals is handled by the scheduler, which takes into account traffic and radio conditions so as to use the resources efficiently while also meeting delay and rate requirements. Scheduling and control signaling may be done on a subframe to subframe basis. Currently there is no dependency between the downlink assignments sent in the different downlink subframes, i.e. each downlink subframe is scheduled independently of others.

As described above, the first step for a terminal to receive data from the base station in a downlink subframe is to detect a downlink assignment in the control field of a downlink subframe. In the case that the base station sends such an assignment but the terminal fails to decode it, the terminal obviously cannot know that is was scheduled and will hence not respond with an ACK/NAK in the uplink. This situation is referred to as a missed downlink assignment. The lack of acknowledgement is sometimes referred to as a Disrupted Transmission (DTX).

If the absence of an ACK/NAK can be detected by the base station, it can interpret such absence of an ACK/NAK as a missed downlink assignment which may initiate subsequent retransmissions. Typically the base station may at least retransmit the missing packet, but it may also adjust some other transmission parameters.

For FDD a terminal can always respond to a downlink data transmission with an ACK/NAK after a fixed delay of 4 subframes, while for TDD there is not a one-to-one relation between uplink and downlink subframes. This was discussed above. Thus the terminal cannot always send an ACK/NAK in response to a downlink assignment in subframe n in uplink subframe n+4, since this subframe may not be allocated to uplink transmission. Hence each downlink subframe may be associated with a certain uplink subframe subject to a minimum processing delay, meaning that ACK/NAKs in response to downlink assignments in subframe n are reported in subframe n+k with k>3. Furthermore, if the number of downlink subframes is larger than the number of uplink subframes, ACK/NAKs in response to assignments in multiple downlink subframes may need to be sent in a single uplink subframe. For a given uplink subframe, the number of associated downlink subframes depends on the configuration of subframes to uplink and downlink, and can be different for different uplink subframe configurations, as further illustrated in Table 1.

TABLE 1

|  |  | Sub frame index n | | | | | | | | | |
|---|---|---|---|---|---|---|---|---|---|---|---|
|  |  | 0 | 1 | 2 | 3 | 4 | 5 | 6 | 7 | 8 | 9 |
| UL: | 0 | DL | DL | UL 1 | UL 0 | UL 1 | DL | DL | UL 1 | UL 0 | UL 1 |
| DL | 1 | DL | DL | UL 2 | UL 1 | DL | DL | DL | UL 2 | UL 1 | DL |
| con- | 2 | DL | DL | UL 4 | DL | DL | DL | DL | UL 4 | DL | DL |
| figu- | 3 | DL | DL | UL 3 | UL 2 | UL 2 | DL | DL | DL | DL | DL |
| ration | 4 | DL | DL | UL 4 | UL 4 | DL | DL | DL | DL | DL | DL |
|  | 5 | DL | DL | UL 9 | DL | DL | DL | DL | DL | DL | DL |
|  | 6 | DL | DL | UL 1 | UL 1 | UL 1 | DL | DL | UL 1 | UL 1 | DL |

Table 1 illustrates the number of downlink subframes associated with each uplink subframe. Uplink subframes are marked UL, downlink subframes are marked DL.

Since downlink assignments can be given independently across downlink subframes, a terminal may be assigned downlink transmissions in multiple downlink subframes that are all to be acknowledged in a single uplink subframe. Thus the number of assigned downlink subframes may exceed the number of uplink subframes. Hence the uplink control signaling needs to support, in some way, feedback of ACK/NAKs from multiple downlink transmissions from a terminal in a given uplink subframe, such as is illustrated in FIG. 1d. In the example depicted in FIG. 1d, four ACK/NAKs in response to downlink transmission in four downlink subframes are to be reported in one single uplink subframe.

In the uplink, DFT-precoded OFDM, also referred to as SC-FDMA is used. A subframe contains two slots with 6 or 7 symbols per slot. In each slot, one symbol is used for transmission of demodulation reference signals and the other symbols may be used for data transmission and control transmission.

Data to be transmitted on the PUSCH is channel coded, scrambled, modulated and then divided into blocks of M symbols, where M is the number of subcarriers allocated in a slot. Each block of M symbols is then subject to a DFT and then, mapped to the carriers used in each slot.

Furthermore, when data is transmitted in the uplink on the PUSCH, control signaling such as ACK/NAK feedback replaces some of the data symbols, this since the control channel and data channel cannot be used simultaneously due to the single carrier property which is important to ensure good uplink coverage. This may be referred to as multiplexing data and control before the DFT and interpreted as a form of time multiplexing. When it comes to ACK/NAK feedback, the encoded ACK/NAK bits may simply replace the data in certain positions, typically close to the reference signals (RS) in order to achieve good performance also at high speeds which cause channel variations.

Figure 1H:
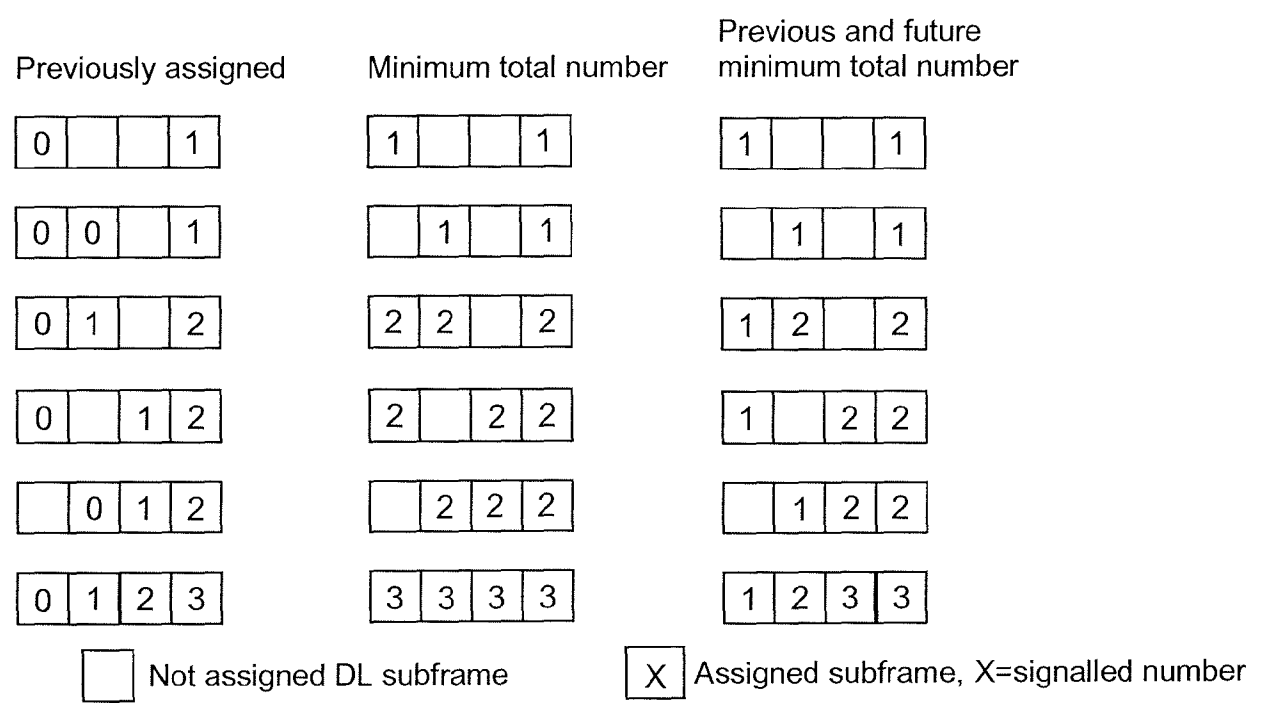

FIG. 1e illustrates multiplexing of data and ACK/NAK control on the Physical Uplink Control Channel (PUCCH) for a case with normal CP. A block of data is generated by mapping the output of a Fast Fourier Transform (FFT) of a block of modulated symbols to a set of subcarriers. In certain symbols, part of the data symbols are replaced by control information, such as encoded ACK/NAK bits before the corresponding DFT and mapping to subcarriers.

The number of bits, or symbols, taken from the data parts and allocated for transmission of ACK/NAK control information is determined from the modulation and coding scheme used for the data as well as a configurable offset. Hence, it is possible for the eNodeB to control the number of bits allocated for ACK/NAK transmission and the encoded ACK/NAK bits then simply overwrites the data in the corresponding positions.

When the terminal is to transmit a single bit of ACK/NAK feedback, it will encode the bit with 0 or 1 and use repetition coding to construct encoded sequences of appropriate lengths. The encoded ACK/NAK sequences are then scrambled and modulated so that two constellation points of maximum distance are used. Essentially, this means that the ACK/NAK effectively uses Binary Phase-Shift Keying (BPSK) modulation, also sometimes referred to as Phase Reversal Keying (PRK) whereas the other symbols may use Quadrature Phase-Shift Keying (QPSK) or Quadrature Amplitude Modulation (QAM) such as e.g. 16 QAM or 64 QAM.

When the terminal is to transmit two bits of ACK/NAK feedback, it will encode the two bits with a (3,2) simplex code and then use repetition of the coded bits to construct encoded sequences of appropriate length. The encoded sequences are then scrambled and modulated so that four constellation points with maximum Euclidean distance is used for the ACK/NAK transmission. Effectively this means that the ACK/NAK bits are transmitted using QPSK modulation whereas the data may be transmitted using QPSK, 16 QAM or 64 QAM modulation.

In short, when the terminal has detected downlink assignments for associated downlink sub-frames, it will generate ACK/NAK encoded sequence of lengths determined from the modulation and coding scheme and a configurable offset. It will then replace some of the data symbols with encoded ACK/NAK symbols. When there is no assignment and hence no ACK/NAK feedback, the terminal will use the corresponding resources for data transmission.

There is one case that requires some care, and that is when the terminal misses the downlink assignment. The base station will then expect that the terminal transmits an ACK/NAK whereas the terminal will transmit random data. The base station will therefore need to perform DTX detection to distinguish between random data and an ACK or NAK. The target error probability for DTX→ACK, i.e. the probability that data is interpreted as an ACK is around 1e-2, whereas the target probability that a terminal misses an assignment is around 1e-2 meaning that the probability that the terminal misses a packet and the eNodeB judges that the data is correctly received by estimating a received ACK is around 1e-4 which coincides with the target error rate of NAK to ACK i.e. the probability that a NAK is interpreted as an ACK.

The base station may thus expect an ACK/NAK in certain positions where data is transmitted. For this purpose, the base station performs DTX detection, in order to distinguish between random data and ACK or NAK.

DTX detection on PUSCH hence means that the base station needs to distinguish random data from an ACK or NAK. This may be done by letting the base station correlate the received signals with the different signal alternative for ACK (and NAK) and comparing with a threshold. For sufficiently large magnitude, an ACK or NAK may be declared. It requires that the length of the ACK/NAK-sequence is sufficiently long.

One obvious way to approach the above problem is to allow the terminal to transmit multiple individual ACK/NAK bits, for each downlink transmission, in a single uplink subframe. Such protocols have however worse coverage than transmission of one or two ACK/NAK reports. In addition, the more ACK/NAKs that are allowed to be transmitted from a single terminal, the more control channel resources need to be reserved in the uplink. To improve control signaling coverage and capacity, it is possible to perform some form of compression, or bundling, of ACK/NAKs. This means that all ACK/NAKs that are to be sent in a given uplink subframe are combined into a smaller number of bits, such as a single ACK/NAK report. As an example, the terminal can transmit an ACK only if the transport blocks of all the downlink subframes were received correctly and hence to be acknowledged. In any other case, meaning that at a NAK for at least one downlink subframe is to be transmitted, a combined NAK is sent for all downlink subframes. As described above, to each uplink subframe in TDD a set of downlink subframes can be associated rather than a single subframe as in FDD, for which downlink transmissions are to be given ACK/NAK response in the given uplink subframe. In the context of bundling this set is often referred to as the bundling window.

FIG. 1f and FIG. 1g illustrates two different uplink (UL): downlink (DL) allocations as an example for how bundling windows may be used. Uplink subframes contains an upward directed arrow, downlink subframes contains an downward directed arrow, and DwPTS/GP/UpPTS subframes comprises both a downward directed arrow and an upward directed arrow in FIGS. 1f and 1g. In the illustrated examples, the number of associated downlink subframes, K, is different for different subframes as well as for different asymmetries.

For the 4DL:1UL configuration in FIG. 1f, the uplink subframe in each half frame is associated with four downlink subframes, such that K=4.

For the 3DL:2UL configuration in FIG. 1g, the first uplink subframe in each half frame is associated with two downlink subframes, thus K=2, while the second is associated with a single DL subframe, K=1.

Another advantage of bundling is that it allows reusing the same control channel signaling formats as for FDD, independently of the TDD uplink/downlink asymmetry. The disadvantage is a loss in downlink efficiency. If the base station receives a NAK it cannot know how many and which downlink subframes were received erroneously and which were received correctly. Hence it may need to retransmit all of them.

A problem with ACK/NAK bundling is that a terminal may miss a downlink assignment, which may not be indicated in the bundled response. For instance, assume that the terminal was scheduled in two consecutive downlink subframes. In the first subframe the terminal misses the scheduling downlink assignment and will not be aware that it was scheduled, while in the second subframe it did successfully receive the data. The terminal will, as a result, transmit an ACK, which the base station will assume holds for both subframes, including data in subframe the terminal was not aware of. As a result, data will be lost.

The lost data needs to be handled by higher-layer protocols, which typically takes a longer time than HARQ retransmissions and is less efficient. In fact, a terminal will not transmit any ACK/NAK in a given uplink subframe only if it missed every downlink assignment that was sent during the bundling window associated with the uplink subframe.

For this reason, a Downlink Assignment Index (DAI) which represents the minimum number of previous and future assigned downlink subframes within the bundling window may be introduced. The terminal may, when receiving multiple downlink assignments, count the number of assignments and compare it with the signaled number in the DAI to see whether any downlink assignment has been missed. In the case that the scheduler is purely causal, the DAI only represents the number of previously assigned downlink subframes within the bundling window. For the case with ACK/NAK feedback on the uplink control channel PUCCH, which is used when there is no data to transmit in the uplink, the terminal may select a PUCCH feedback channel associated with last received/detected downlink assignment and in this way signal to the base station which was the last received downlink assignment. The base station may then detect if the terminal has missed any downlink assignments, in the end of the bundling window.

Alternatively, the base station scheduler may perform a partial scheduling of future downlink subframes within the bundling window and indicate to the terminal whether it will also receive one or more additional assignment in addition to the number of previously assigned subframes. Hence, the DAI then represents the number of previous assignments plus at least one more for the case that at least one more downlink subframe will be assigned. The terminal will then know by inspecting the DAI of the last received downlink assignment not only the number of previous subframes but also whether there will be at least one more. Hence, the DAI contain the sum of the previous assignments plus the minimum number of future assignments.

A third alternative, in addition to the two previously mentioned alternatives is to signal the total number of downlink subframes within the bundling window. The three mentioned alternative uses of the DAI are illustrated in FIG. 1h.

An alternative solution to handle missed downlink assignments may be to signal in the uplink the number of received downlink assignments in addition to the bundled ACK/NAK. The base station, which has knowledge of the number of assigned downlink subframes, can then compare the reported number of subframes to judge whether the terminal has missed one or more assignments.

One candidate solution for multiple ACK/NAK transmission on PUCCH is to employ PUCCH resource selection. Each PUCCH format 1a or 1b resource can carry 1 or 2 bit of information with BPSK or QPSK modulation. Assuming that the terminal has received D downlink subframes and that associated with each received downlink subframe it can determine a PUCCH format 1b resource, which can carry 1 or 2 bits. Then in total the terminal can by selecting resource, and the bits carried on the resource signal, in total up to 4D different messages, assuming PUCCH format 1b with QPSK modulation. For PUCCH format 1a with BPSK modulation, there are up to 2D resources. Each such message can represent a combination of ACK/NAK/DTX for the D different subframes. With D=4, there are 16 messages which is enough to convey 4 bits of information representing for example ACK or NAK/DTX of four different subframes. In fact, 4D+1 signal alternatives are possible in total since an additional alternative is to not send anything at all from the terminal, i.e. a disrupted transmission DTX.

For PUSCH, there is currently no agreed solution.

Thus, a missed downlink assignment will in general result in block errors that need to be corrected by higher-layer protocols, which in turn has a negative impact on performance in terms of throughput and latency. Also, increasing the delay may cause undesirable interactions with Transmission Control Protocol (TCP) based applications.

To be able to handle all error case for ACK/NAK bundling, in particular when the bundled ACK/NAK is transmitted on PUSCH, the scheduler needs to account for future assignments within the bundling window. This may however be challenging, from a scheduler implementation view, and may bring a latency increase. This since scheduling of not only one subframe, but at least partially also one future subframe, requires more processing time and also access to HARQ feedback which may not be available. A preferred solution is thus to use the DAI so that it only contains a counter of the number of previous assigned subframes.

When it comes to ACK/NAK bundling, there is a problematic case, namely when the bundled ACK/NAK is to be transmitted on the data channel PUSCH, time multiplexed with the data. The terminal can then not indicate to the terminal by means of selecting a PUCCH channel for the ACK/NAK which was the last received downlink assignment. Hence, the scheduling may then be non-causal in the sense that the DAI contain information on future assignments.

When it comes to multiplexing of multiple ACK/NAKs, a problem is that currently only feedback of 1 and 2 bits of ACK/NAK feedback is defined and there is no solution for more than three bits.

SUMMARY

It is therefore an object of the present invention to provide a mechanism for improving the performance in a communication system.

According to a first aspect of the present invention, the object is achieved by a method in a terminal for providing acknowledgement information or non-acknowledgement information (ACK/NAK) to a base station concerning the reception status of data packets received in a subframe from the base station. The method comprises generating ACK/NAK to be sent to the base station. Also, a scrambling code is selected. The generated ACK/NAK is scrambled with the selected scrambling code. Further the scrambled ACK/NAK is sent to the base station.

According to a second aspect of the present invention, the object is achieved by an arrangement in a terminal for providing ACK/NAK to a base station. The ACK/NAK concerns the reception status of data packets received from the base station in a subframe. The arrangement comprises a generating unit. The generating unit is adapted to generate ACK/NAK to be sent to the base station. Also, the arrangement comprises a selecting unit. The selecting unit is adapted to select a scrambling code. The arrangement further comprises a scrambling unit. The scrambling unit is adapted to scramble the generated ACK/NAK with the selected scrambling code. Also, the arrangement in addition comprises a sending unit. The sending unit is adapted to send the scrambled ACK/NAK to the base station.

According to a third aspect of the present invention, the object is achieved by a method in a base station for receiving ACK/NAK from a terminal, concerning the reception status of data packets previously sent to the terminal in a subframe. The method comprises receiving scrambled ACK/NAK from the mobile terminal. Also, the method comprises selecting a scrambling code. Further, the received scrambled ACK/NAK is descrambled using the selected scrambling code. Further yet, it is determined if the descrambled ACK/NAK comprises an affirmation that all data packages within the sent subframes have been correctly received by the terminal and that no subframe, expected to be received by the terminal, has been missed. Additionally, the previously sent data packets within the subframes associated with the ACK/NAK are resent if it could not be determined that the received ACK/NAK comprises affirmative information ACK, confirming a correct reception of all data packages within the sent subframes, and that no subframe, expected to be received by the terminal, has been missed.

According to a fourth aspect of the present invention, the object is achieved by an arrangement in a base station for receiving ACK/NAK from a terminal concerning the reception status of data packets previously sent in a subframe to the terminal. The arrangement comprises a receiving unit. The receiving unit is adapted to receive scrambled ACK/NAK from the terminal. Further, the arrangement comprises a selecting unit. The selecting unit is adapted to select a scrambling code. Also, the arrangement further yet comprises a descrambler. The descrambler is adapted to descramble the received scrambled ACK/NAK using the selected scrambling code. Additionally, the arrangement comprises a determination unit. The determination unit adapted to determine if the descrambled ACK/NAK comprises an acknowledgement that all data packages within the sent subframes have been correctly received by the terminal and that no subframe, expected to be received by the terminal, has been missed. Still further, the arrangement also comprises a sending unit. The sending unit is adapted to send and/or resend data packets within a subframe to the terminal.

Thanks to the application of a scrambling code to the ACK/NAK, the base station can avoid, or at least reduce the probability for, misinterpretation of a non-acknowledgement for an acknowledgement, or vice versa. Thereby the risk of loosing information and/or resending correctly received information is reduced. Thus the performance of the communication system is improved.

BRIEF DESCRIPTION OF THE DRAWINGS

The invention is described in more detail with reference to attached drawings illustrating exemplary embodiments of the invention and in which:

FIG. 1h is a schematic block diagram illustrating association of downlink subframes with an uplink subframe for uplink/downlink allocation according to prior art.

DETAILED DESCRIPTION

Embodiments herein include a method and an arrangement in a base station and a method and an arrangement in a terminal. This invention may, however, be embodied in many different forms and is not to be considered as limited to the embodiments set forth herein; rather, these embodiments are provided so that this disclosure will be thorough and complete, and convey the scope of the invention to those skilled in the art.

Still other objects and features of the present invention may become apparent from the following detailed description considered in conjunction with the accompanying drawings. It is to be understood, however, that the drawings are designed solely for purposes of illustration and not as a definition of the limits of the invention, for which reference is to be made to the appended claims. It is further to be understood that the drawings are not necessarily drawn to scale and that, unless otherwise indicated, they are merely intended to conceptually illustrate the structures and procedures described herein.

Figure 1A:
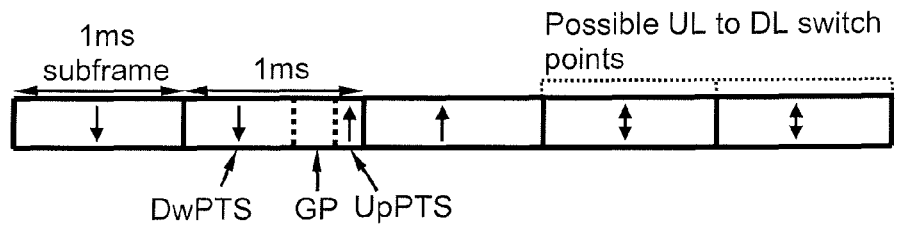
FIG. 1a is a schematic block diagram illustrating a radio frame according to prior art.
Figure 1B:
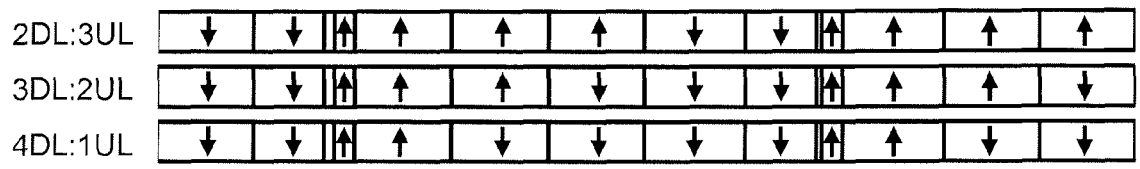
FIG. 1b is a schematic block diagram illustrating allocation of subframes according to prior art.
Figure 1C:
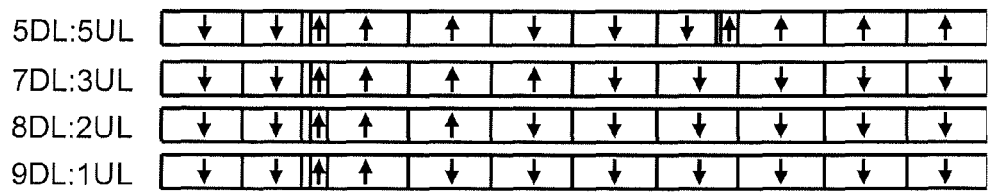
FIG. 1c is a schematic block diagram illustrating allocation of subframes according to prior art.
Figure 1D:
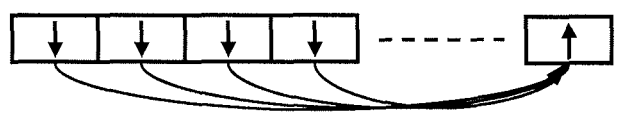
FIG. 1d is a schematic block diagram illustrating uplink acknowledgement in response to four downlink subframes according to prior art.
Figure 1E:
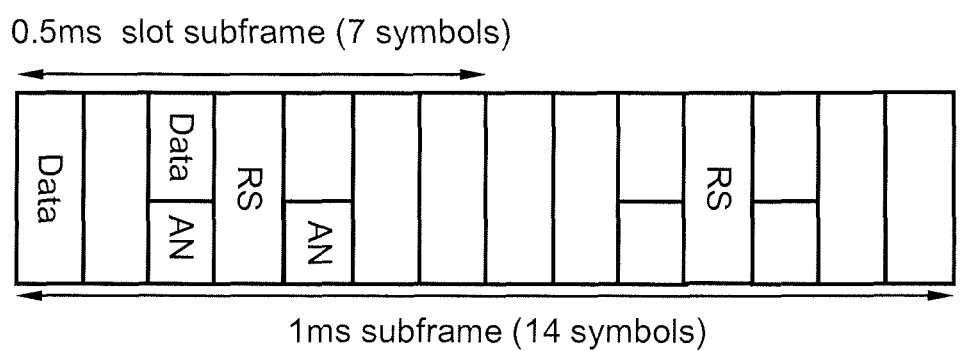
FIG. 1e is a schematic block diagram illustrating multiplexing of data and ACK/NAK control on PUCCH, according to prior art.
Figure 1F:
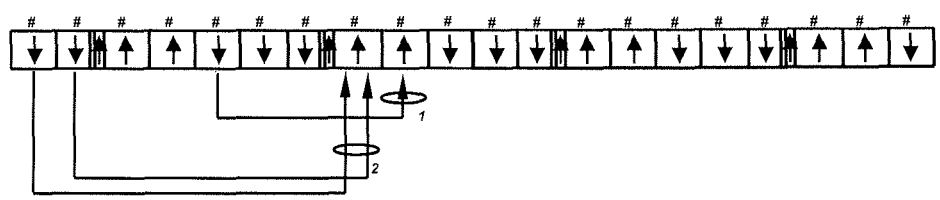
FIG. 1f is a schematic block diagram illustrating association of downlink subframes with an uplink subframe for an uplink/downlink allocation according to prior art.
Figure 1G:
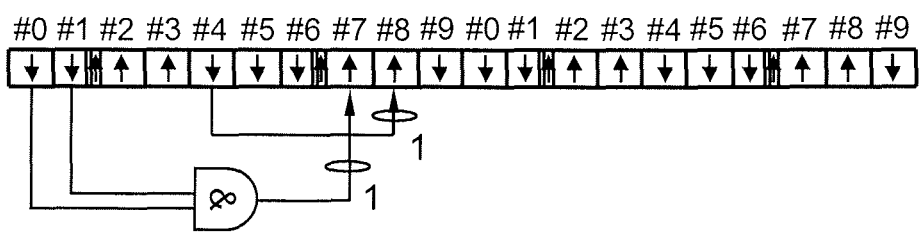
FIG. 1g is a schematic block diagram illustrating association of downlink subframes with an uplink subframe for another uplink/downlink allocation according to prior art.
Figure 2:
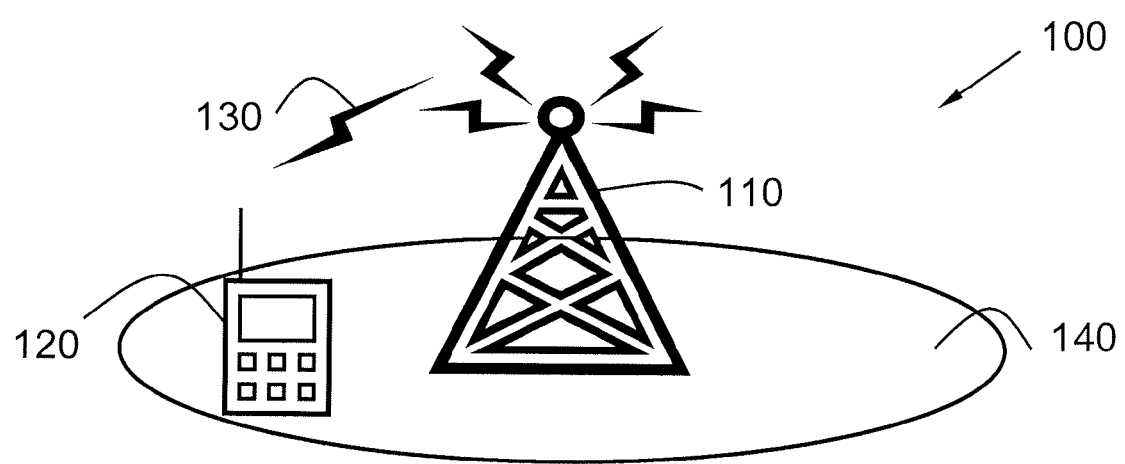
FIG. 2 is a schematic block diagram illustrating embodiments of a wireless communication system.

FIG. 2 depicts a wireless communication system 100, such as e.g. the E-UTRAN, LTE, LTE-Adv, 3rd Generation Partnership Project (3GPP) WCDMA system, Global System for Mobile communications/Enhanced Data rate for GSM Evolution (GSM/EDGE), Wideband Code Division Multiple Access (WCDMA), Worldwide Interoperability for Microwave Access (WiMax), or Ultra Mobile Broadband (UMB). The communication system 100 may use TDD and comprises a base station 110 and a terminal 120 adapted to communicate with each other over a TDD radio channel 130 within a cell 140.

The base station 110 may be referred to as e.g. a NodeB, an evolved Node B (eNode B), a base transceiver station, Access Point Base Station, base station router, or any other network unit capable to communicate with the terminal 120 over the radio channel 130 depending e.g. of the radio access technology and terminology used. In the rest of the description, the term "base station" will be used for the base station 110, in order to facilitate the comprehension of the present methods and arrangements.

The terminal 120 may be represented by e.g. a wireless communication terminal, a mobile cellular phone, a Personal Digital Assistant (PDA), a user equipment (UE), a laptop, a computer or any other kind of device capable to communicate with a base station over the radio channel 130.

The base station 110 may use HARQ and ACK/NAK bundling, at least for certain uplink subframes, for transmitting data packets over the radio channel 130. The data packets are transported in transport blocks within subframes over the radio channel 130. For this purpose, the base station 110 schedules a number of subframes to be transmitted to the terminal 120. If a NAK message is received from the terminal 120, or a DTX is detected, the base station 110 may retransmit the non-acknowledged subframes until they have been acknowledged by the terminal 120 or until a time period expires, which time period may be a pre-determined time period.

For a given uplink subframe, a number of downlink subframes, denoted K, transmitted from the base station 110 to the terminal 120 may be associated according to some embodiments. However, in some embodiments, a downlink control channel may carry a downlink assignment in each downlink subframe being associated with a certain uplink control channel resource. In an exemplary case, ACK/NAKs from up to K downlink subframes may be bundled into one uplink single subframe, i.e. such that the bundling window comprises K downlink subframes. The downlink subframes may be numbered from 1 to K. Within this set of subframes, the base station 110 may assign downlink transmissions to a given terminal 120. The number of assigned subframes, k' can be between 0 and K.

Figure 3:
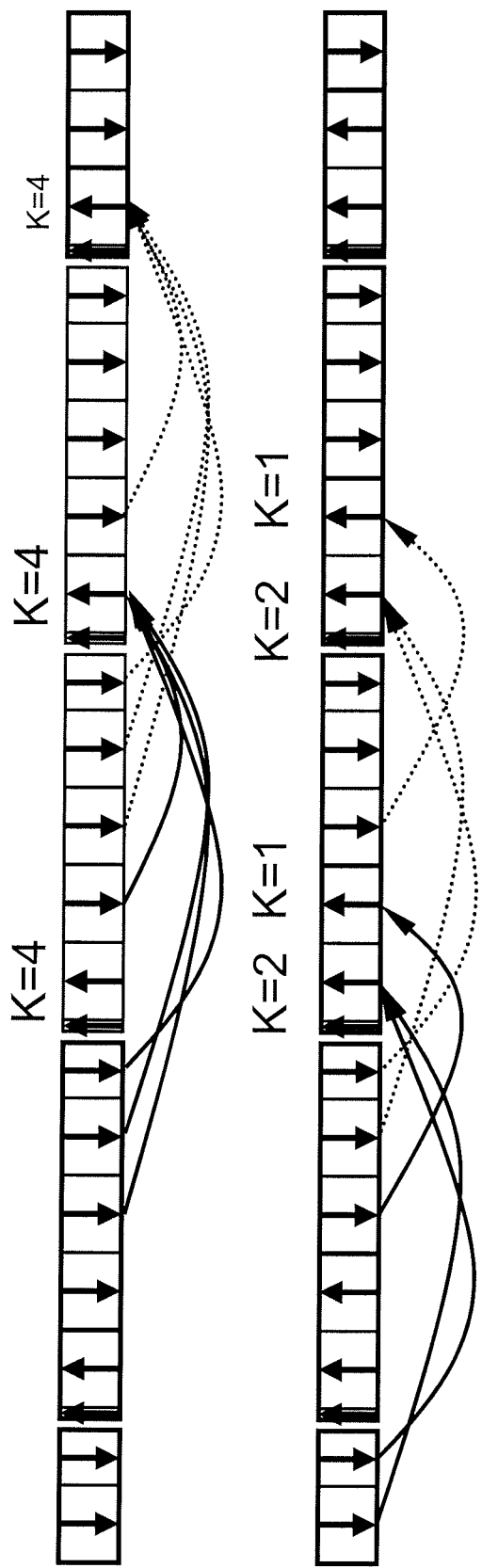
FIG. 3 is a schematic block diagram illustrating embodiments of an association of downlink subframes with an uplink subframe for an uplink/downlink allocation.

FIG. 3 illustrates embodiments of an association of downlink subframes with an uplink subframe for an uplink/downlink allocation. Thus each downlink subframe is associated with an uplink subframe for two different UL:DL allocations. In the depicted example, the number of associated downlink subframes, K, is different for different subframes as well as for different asymmetries. For the 3DL:2UL configuration at the bottom, the first uplink subframe in each half frame is associated with two downlink subframes (K=2), while the second is associated with a single downlink subframe (K=1).

The downlink control channel which carries the downlink assignment in each downlink subframe is associated with a certain uplink control channel resource. For example, according to some embodiments, the case when ACK/NAKs from K downlink subframes are to be bundled into an uplink single subframe, i.e. the bundling window comprises K downlink subframes, and number the downlink subframes from 1 to K. Two non limiting examples are illustrated in FIG. 3 for facilitating the understanding of the present method.

The terminal 120 may attempt to decode downlink assignments in each downlink subframe, and can hence keep track of the number of detected downlink assignments during the bundling window. For each downlink subframe in which the terminal 120 receives a downlink assignment, a counter counting the number of received downlink assignments may be incremented.

The terminal 120 may further attempt to decode the transport blocks in the downlink sub-frames in which it has detected a downlink assignment and by means of a Cyclic Redundancy Check (CRC) estimate whether the transport block is correctly received or not.

The terminal 120 may further compare the counter on the number of received downlink assignments with a DAI signaled from the base station 110, if such is signaled, to determine at least if any previous downlink subframe has been missed or not, according to some embodiments.

For the case that the terminal 120 knows it has missed at least one downlink assignment, it may choose to respond with a discontinuous transmission (DTX), which means that no response is given. The terminal 120 may alternatively respond with a NAK in this case. Further, if the decoding of at least one of transport block failed, it may also generate a NAK, or possibly respond with DTX and hence transmit only data and no ACK/NAK.

Furthermore, for the case that all detected transport blocks in the detected subframes were successfully received by the terminal 120, an ACK may be generated. Furthermore, the terminal 120 also knows how many subframes, or transport blocks, that were successfully received, according to some embodiments.

Embodiments herein define a plurality of scrambling sequences for scrambling of the encoded ACK/NAK sequences. These scrambling sequences may be applied to the ACK/NAK sequences either in ACK/NAK bundling mode or in ACK/NAK multiplexing mode. In ACK/NAK bundling mode, the terminal 120 may select the scrambling sequence based on either the subframe number of the last received downlink subframe, or the total number of received downlink subframes within the bundling window. In ACK/NAK multiplexing mode, the terminal 120 may encode information by selecting the 1 or 2 coded bits as well as the scrambling code. With 0 scrambling codes, up to 40 different messages representing ACK/NAK feedback may be transmitted. These different ways of selecting scrambling code are here presented and discussed more in detail:

ACK/NAK Bundling Mode, Selecting Scrambling Code Based on Last Received DL Sub-Frame Number, Single ACK/NAK Bit When operating in ACK/NAK bundling mode, the terminal 120 may encode the ACK or NAK with 0 and/or 1, perform repetition coding to generate a sequence with the correct length N and then select a scrambling code based on the subframe number of the last received downlink subframe, which subframe number may be denoted k. Hence for the case that there are K subframes associated with the uplink subframe, then there can be K different scrambling codes. For the case that there are L<K scrambling codes, the same scrambling code may be used for several different last received downlink subframe numbers.

The different scrambling codes may be constructed from shorter lengths. Orthogonal codes may be used with a particular advantage, e.g. to achieve a minimum Hamming distance which is as long as possible, i.e. such that the minimum Hamming distance between all the code words in the code set achieves the Plotkin bound, which is the longest Hamming distance that may be achieved. Thus the error rate, i.e. the risk of misinterpreting an ACK for an NAK may be reduced.

For example, four orthogonal codes of length four may be taken from the columns of the size 4 Hadamard matrix. Then the sequences may be repeated a suitable number of times to align with the length of the encoded ACK/NAK sequence. It may also be possible to generate other forms of sequences, for example long pseudo random sequences with low cross correlation properties, or sequences as a function of the length N.

It may be possible to modify the way N, the length of the encoded ACK/NAK sequence, is determined as a function of the MCS and a configurable offset so that it is a multiple of four and/or with a minimum length of four to guarantee that the scrambling codes are orthogonal.

The base station 110 may then descramble and attempt to decode the corresponding ACK/NAK bits, for example with the scrambling code that corresponds to the last assigned downlink subframe. If there is a mismatch between the scrambling codes used by the base station 110 and the terminal 120, for example in the sense that the terminal 120 missed the last received downlink assignment, then the scrambling codes may be chosen so that the descrambled data is even less correlated with the possible ACK/NAK waveform as compared with the case based on random data. The scrambling codes may thus be chosen to make the transmitted ACK/NAKs appear as random data when there is a mismatch. This is similar to the case that the terminal 120 responds with DTX, no ACK/NAK transmission that is, after having detected from the DAI that at least one downlink subframe has been missed. Thereby the base station 110 may be triggered to initiate a resending, in the belief of having detected a DTX.

As a non limiting example, it may be assumed a set of K orthogonal binary sequences of length K. An example with K=4 is illustrated in Table 2, which thus illustrates an example of scrambling with short orthogonal scrambling codes.

TABLE 2

| k | Scrambling code $[c_k(0)\ c_k(1)\ c_k(2)\ c_k(3)]$ |
|---|---|
| 1 | [1 1 1 1] |
| 2 | [1 0 1 0] |
| 3 | [1 1 0 0] |
| 4 | [1 0 0 1] |

Furthermore, the single ACK/NAK bit may have been encoded and repeated so that a sequence q'(0), q'(1), q'(2), ..., q'(N−1) may be achieved. Then this sequence may be scrambled with the sequence ck( ) to generate the scrambled ACK/NAK sequence q(0), q(1), q(2), ..., q(N−1).

This may be expressed, in an alternative way of describing the present method according to some embodiments:

```
Set i,j to 0
while i<N
    q(i)=q(i)+c_k(j)      // modulo-2 addition
    i=i+1;
    j=(j+1) mod K;
endwhile
```

ACK/NAK Bundling Mode, Selecting Scrambling Code Based on the Number of Received Downlink Assignments This embodiment is similar to the previously described embodiment. Instead of selecting the scrambling code based on the number of the last received downlink subframe, the terminal 120 selects the scrambling code based on the number of received downlink assignment.

ACK/NAK when in MIMO Operation

For the case of MIMO operation, there are two bits of HARQ ACK/NAK feedback. The terminal 120 may then encode them with a length (3, 2) simplex code, and in essence repeat or concatenate a plurality of such length 3 code words to the appropriate number of encoded bits.

Similar to the previous embodiments, based on either the last received downlink subframe number or the total number of received downlink subframes within the bundling window, the terminal 120 may select a scrambling code. To keep the scrambled encoded sequences orthogonal, the basic short scrambling codes may be extended by first repeating each element three times, and then repeating the resulting sequence, which is a three times as long sequence, enough number of times in order to align it with the length of encoded ACK/NAK bits.

Thus, as an example, the two ACK/NAK bits may have been encoded and repeated so that a sequence q'(0), q'(1), q'(2), ..., q'(N−1) is generated. Then this generated sequence may be scrambled with the sequence ck( ) to generate the scrambled ACK/NAK sequence as q(0), q(1), q(2), ..., q(N−1).

This may be expressed, in an alternative way of describing the present method according to some embodiments:

```
Set i,j to 0
while i<N
    q(i)=q(i)+c_k( floor(j/3) )   // modulo-2 addition, floor rounds
                                  // towards zero
    i=i+1;
    j=(j+1) mod 3K;
endwhile
```

ACK/NAK Multiplexing

Similar to the case with ACK/NAK bundling as described above, there may be, for each of the K downlink subframes, in principle three possible feedbacks: ACK, NAK or DTX. It may be assumed that for the case with MIMO transmission that the two ACK/NAKs are combined into a single ACK if both bits are ACK and NAK otherwise. DTX corresponds to the case that the terminal 120 did not detect any downlink assignment in the corresponding downlink subframe.

With K subframes there are then in principle $3^K$ different possible messages. For the case that no distinction is made between NAK and DTX; there are $2^K$ different messages that may be conveyed to the base station 110.

As a non limiting example, it may be assumed that only a single bit of information may be encoded with a certain block code and that a selection may be made between L different scrambling codes for scrambling of this bit. Thus 2L different bits may be signaled by encoding of a single bit and scrambling code selection.

For the case that the block code encodes two bits, 4L different messages may be transmitted. Note that this assumes that the length of the encoded and scrambled bit sequence N is sufficiently long.

According to some embodiments, each of the $2^K$ or $3^K$ different possible decoding results may be associated with one of the 2L or 4L possible messages. As an example, ACK/NAK feedback of 2 subframes may be transmitted using a block code which can code only a single bit combined with L=2 different scrambling codes. Then the mapping may be according to Table 3.

TABLE 3

| ACK/NAK of the two subframes | Scrambling code, encoded bit |
|---|---|
| AA | L = 2, d = 1 |
| AN | L = 2, d = 0 |
| NA | L = 1, d = 1 |
| NN | L = 1, d = 0 |

Table 3 illustrates an example of mapping ACK/NAK of two subframes to a single encoded bit d, and a scrambling code. For example, if the first subframe is ACK and the second is NAK, then a bit with value d=0 may be encoded and scrambled with the scrambling code L=2.

For the case that a block code which encodes two bits d1, d2 into sequences of length N, for example with a (3,2) simplex code and repetition of code blocks one may transmit ACK/NAKs of three different downlink subframes using L=3 scrambling codes.

Figure 4:
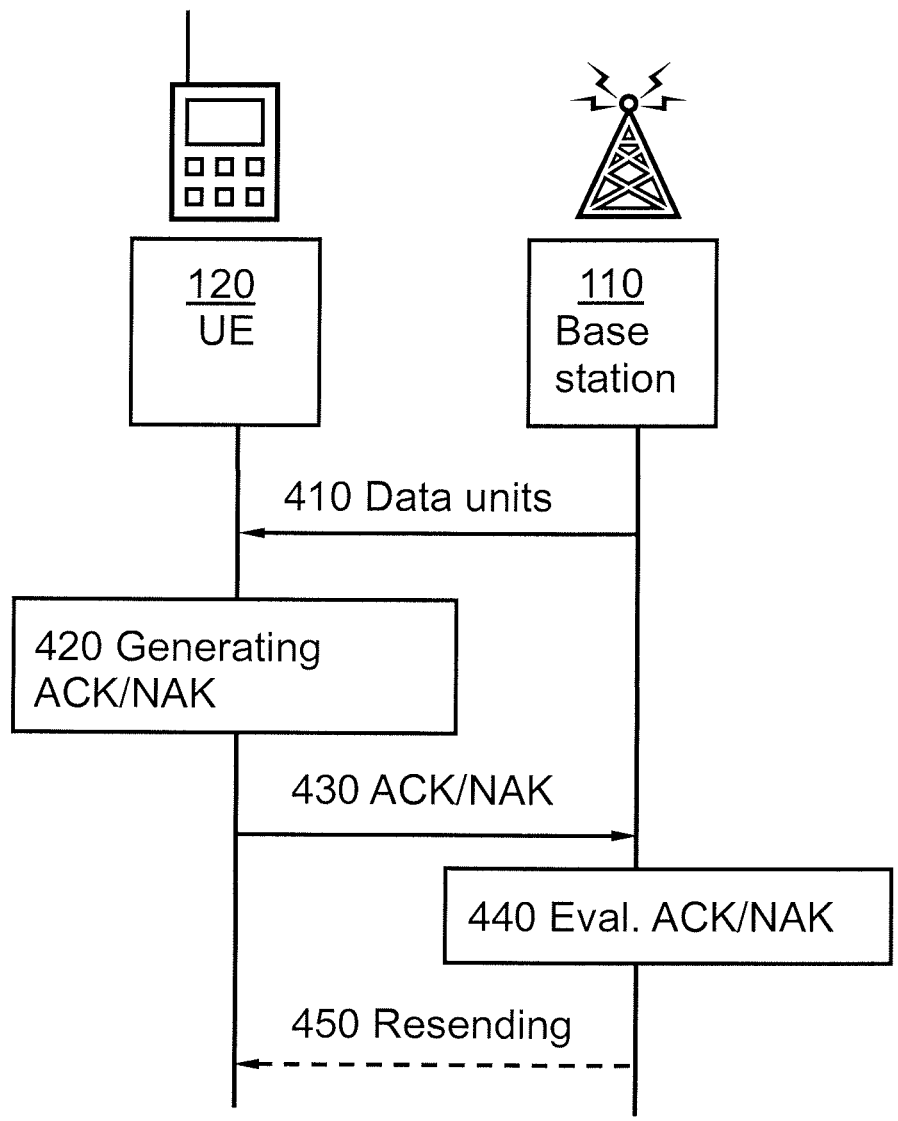
FIG. 4 is a combined signaling and flowchart illustrating radio signal transmission

FIG. 4 is a combined signaling and flowchart illustrating radio signal transmission according to some embodiments. The purpose of this illustration is to provide a general overview of the present methods and the functionalities involved.

Step 410

The base station 110 transmits data packages in a subframe to the terminal 120. The received subframes may according to some embodiments be comprised in a bundling window.

Step 420

The terminal 120 receives the transmitted data. According to some embodiments, the data packages are decoded within the received subframes in the terminal 120. Then, the subframe number of the last received subframe may be extracted. A counter, counting the number of received subframes may be incremented for each received subframe. Thus a comparison may be made between the extracted subframe numbers and the counted received number of subframes, in order to establish if any subframes expected to be received, are missing.

The detection of missed subframes may optionally comprise receiving an index, which index is associated to the number of subframes comprised within the bundling window, and comparing the received index value with the number of counted received subframes, according to some embodiments.

Further, it may be established if any data package within a received subframe is incorrectly received. The step of establishing whether any data packet within the received subframe is not correctly received may according to some embodiments comprise performing a Cyclic Redundancy Check (CRC) on the received data and comparing the result of the CRC with a received checksum, associated with the received data and computed by the base station 110 before sending the data.

Thus acknowledgement information ACK/NAK may be generated at the terminal 120. The acknowledgement information may be a positive confirmation of a correct transmission, ACK. Further, the acknowledgement information may be a negative acknowledgement, NAK, comprising an indication of that either some data package has not been received correctly, or any subframe expected to be received, has been missed.

If the terminal 120 miss all the subframes that has been sent to it from the base station 110, the result is a disruption of transmission DRX.

The generated acknowledgement information ACK/NAK may further be encoded with a length simplex code to achieve appropriate length of the acknowledgement information before performing the scrambling with the selected scrambling code. Then, a scramble code may be selected such that the acknowledgement information ACK/NAK may be scrambled with the selected scramble code.

Step 430

The generated and scrambled acknowledgement information ACK/NAK is transmitted to the base station 110.

Step 440

The base station 110 receives the scrambled acknowledgement information ACK/NAK from the terminal 120. Further, a scramble code may be obtained. The obtained scramble code may be used for descrambling the received scrambled acknowledgement information ACK/NAK. When the acknowledgement information ACK/NAK is descrambled, it may be determined if the acknowledgement information is a positive acknowledgement ACK. If it is, the sending may proceed with the sending of the subsequent subframes, if there is more data to send to the terminal 120. Otherwise, a resending may be performed in step 450.

Step 450

Step 450 is optional and may only be performed if a negative acknowledgement NAK is received, or DRX detected. The data for which no positive acknowledgement ACK has been received may be resent to the terminal 120.

Figure 5:
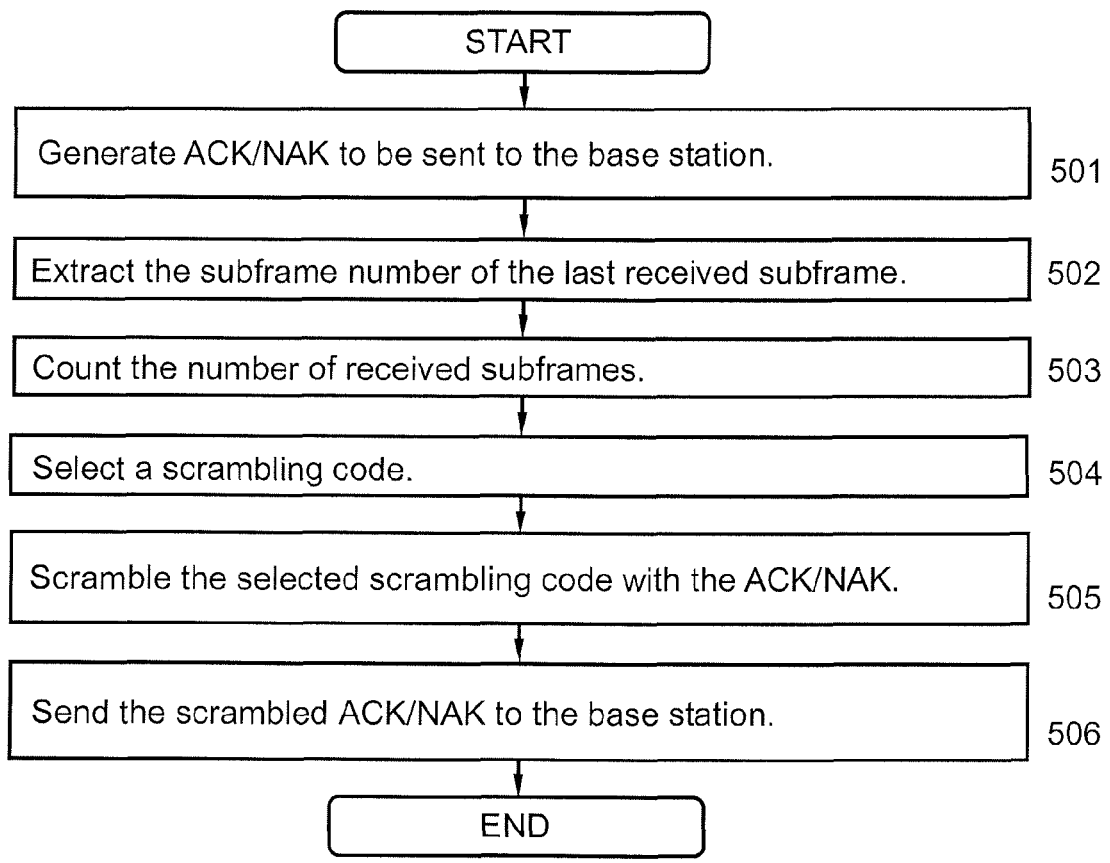
FIG. 5 is a flow chart illustrating embodiments of a method in a terminal.

FIG. 5 is a flow chart illustrating embodiments of method steps 501-506 performed in a terminal 120. The method aims at providing acknowledgement information or non-acknowledgement information ACK/NAK to a base station 110, concerning the reception status of data packets received in a subframe from the base station 110. The terminal 120 may be e.g. a mobile terminal, such as e.g. a mobile cellular telephone. It may be assumed that for the case with MIMO transmission that the two ACK/NAKs may be combined into a single ACK if both bits are ACK. Otherwise, if at least one bit is NAK, the two ACK/NAKs may be combined into a single NAK, or alternatively, a DTX.

To appropriately provide feedback to the base station 110 concerning the reception status of received data packets, the method may comprise a number of method steps 501-506.

It is however to be noted that some of the described method steps are optional and only comprised within some embodiments. Further, it is to be noted that the method steps 501-506 may be performed in any arbitrary chronological order and that some of them, e.g. step 501 and step 505, or even all steps may be performed simultaneously or in an altered, arbitrarily rearranged, decomposed or even completely reversed chronological order. The method may comprise the following steps:

Step 501

ACK/NAK to be sent to the base station 110 is generated.

The generated ACK/NAK may be an ACK, confirming that all data packages within the received subframes have been correctly received and that no subframe, expected to be received, has been missed, if it is established that all data packages within the received subframes have been correctly received and detected that no subframe, expected to be received, has been missed.

According to some embodiments, the step of generating ACK/NAK comprises generating a NAK confirming that all data packages within the received subframes have not been correctly received and/or that at least some subframe, expected to be received, has been missed, if it is established that all data packages within the received subframes have not been correctly received and/or detected that at least some subframe, expected to be received, has been missed.

According to some embodiments, the ACK/NAK may be sent concerning all the subframes comprised within an optional bundling window.

The ACK/NAK may be encoded with a length simplex code to achieve appropriate length of the ACK/NAK before performing the scrambling with the selected scrambling code, according to some optional embodiments.

Step 502

This step is optional and may only be performed within some embodiments. The subframe number of the last received subframe may be extracted.

Step 503

This step is optional and may only be performed within some embodiments. The number of received subframes from the base station 110 may be counted.

Step 504

A scrambling code is selected. The scrambling code may optionally be an orthogonal code.

The selection of the scrambling code may optionally be performed based on the extracted last received subframe number.

The selection of the scrambling code may however according to some embodiments be performed based on the total number of received subframes.

However, the selection of the scrambling code may further according to some embodiments be performed based on the acknowledgement information to be sent to the base station 110. Thus, feedback concerning a plurality of received subframes may be generated by combining the generated ACK/NAK with the selection of scrambling code.

Step 505

The generated ACK/NAK is scrambled with the selected scrambling code.

The step of scrambling the selected scrambling code with the ACK/NAK may according to some embodiments comprise adding the selected scrambling code to the generated ACK/NAK using modula-2 addition.

However, according to some embodiments, the step of scrambling the selected scrambling code with the ACK/NAK may comprise associating the selected scrambling code with the generated ACK/NAK by means of a lookup table.

Step 506

The scrambled ACK/NAK is sent to the base station 110. The sending is performed in order to provide feedback to the base station 110 concerning the reception status of the data packets within the received subframes.

Figure 6:
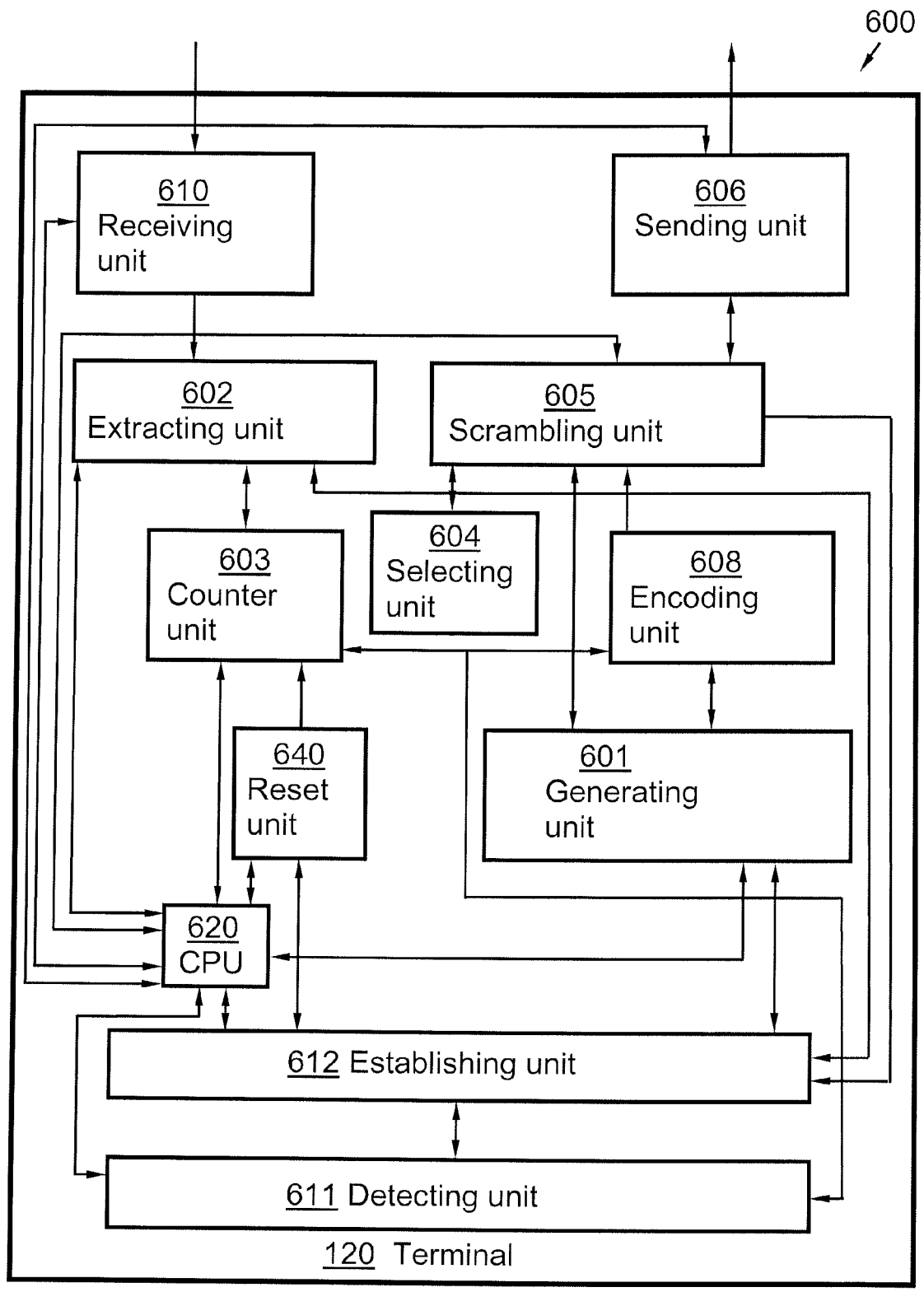
FIG. 6 is a schematic block diagram illustrating embodiments of a terminal arrangement.

FIG. 6 schematically illustrates an arrangement 600 in a terminal 120. The terminal 120 may be a mobile terminal such as e.g. a mobile phone. The arrangement 600 is adapted to receive data packets from a base station 110 and provide acknowledgement information or non-acknowledgement information ACK/NAK to a base station 110 concerning the reception status of data packets received in a subframe from the base station 110. Further the arrangement 600 is adapted to perform the method steps 501-506.

In order to perform the method steps 501-506, the arrangement 600 comprises a plurality of units such as e.g. a generating unit 601 The generating unit 601 is adapted to generate ACK/NAK to be sent to the base station 110. Further, the arrangement 600 also comprises a selecting unit 604. The selecting unit 604 is adapted to select a scrambling code. Further yet, the arrangement 600 additionally also comprises a scrambling unit 605. The scrambling unit 605 is adapted to scramble the selected scrambling code with the ACK/NAK. The arrangement 600 also, in further addition comprises a sending unit 606. The sending unit 606 is adapted to send the scrambled ACK/NAK to the base station 110 in order to provide feedback to the base station 110 concerning the reception status of the data packets within the received subframes.

Optionally, the arrangement 600 also may comprise a receiver unit 610. The receiver unit 610 is adapted to receive data packets from the base station 110 in a subframe. Also, the arrangement 600 further may comprise an establishing unit 612. The establishing unit 612 is adapted to establish whether any data packet within the received subframe is correctly received or not. Still further, the arrangement 600 additionally may comprise a detecting unit 611. The detecting unit 611 is adapted to detect whether any subframe, expected to be received, has been missed. The arrangement 600 further also may comprise a processing unit 620. The processing unit 620 may be represented by e.g. a Central Processing Unit (CPU), a processor, a microprocessor, or other processing logic that may interpret and execute instructions. The processing unit 620 may perform all data processing functions for inputting, outputting, and processing of data including data buffering and device control functions, such as call processing control, user interface control, or the like.

It is to be noted that any internal electronics of the terminal 120 not completely necessary for performing the present method according to the method steps 501-506 has been omitted from FIG. 6, for clarity reasons. Further, it is to be noted that some of the described units 601-640 comprised within the arrangement 600 in the terminal 120 are to be regarded as separate logical entities but not with necessity separate physical entities. To mention just one example, the receiving unit 610 and the sending unit 606 may be comprised or co-arranged within the same physical unit, a transceiver, which may comprise a transmitter circuit and a receiver circuit, which transmits outgoing radio frequency signals and receives incoming radio frequency signals, respectively, via an antenna. The antenna may be an embedded antenna, a retractable antenna or any antenna known to those having skill in the art without departing from the scope of the present invention. The radio frequency signals transmitted between the terminal 120, the base station 110 may comprise both traffic and control signals e.g. paging signals/messages for incoming calls, which may be used to establish and maintain a voice call communication with another party or to transmit and/or receive data, such as SMS, e-mail or MMS messages, with a remote terminal.

Figure 7:
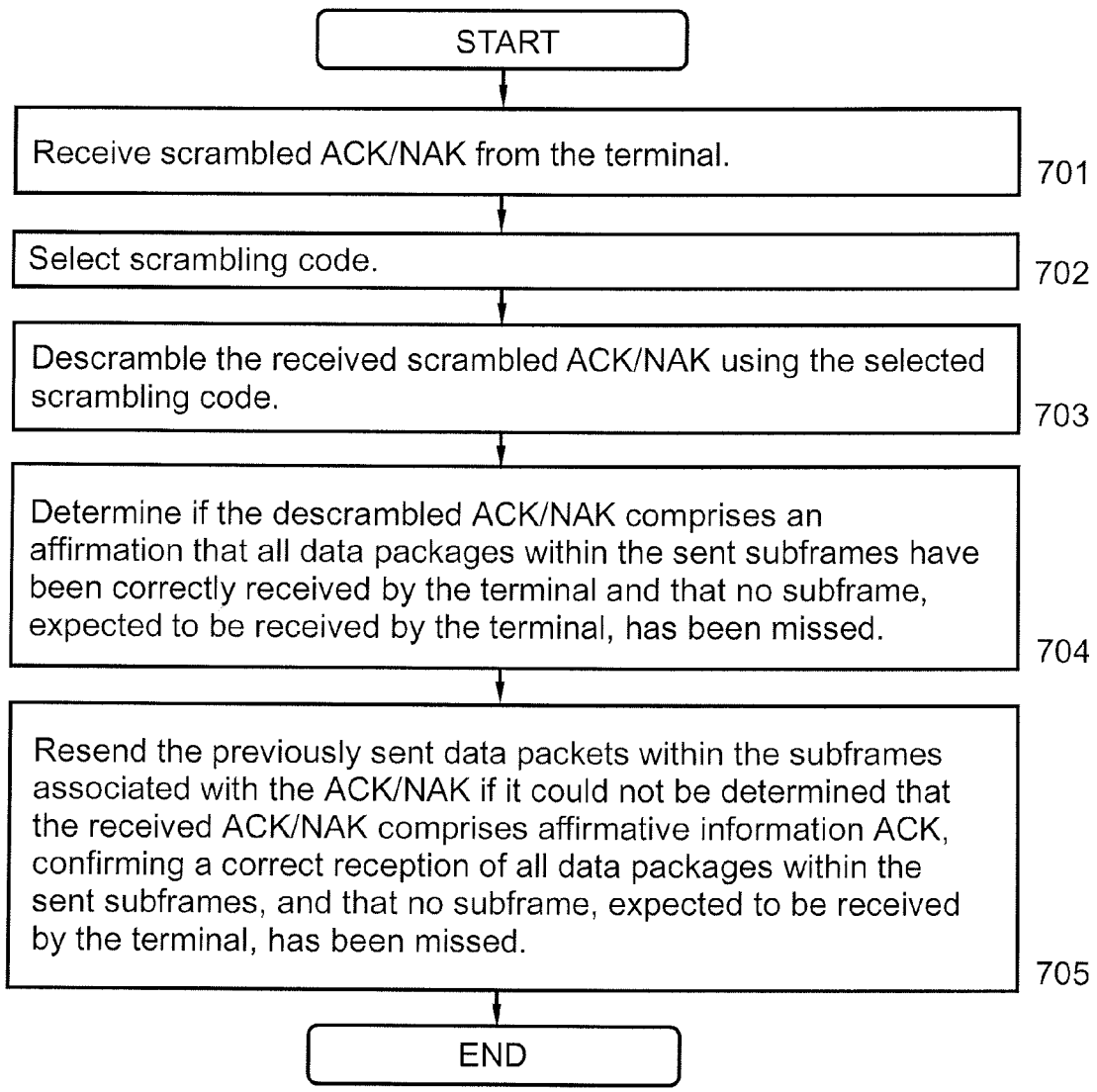
FIG. 7 is a flow chart illustrating embodiments of a method in a base station.

FIG. 7 is a flow chart illustrating embodiments of method steps 701-705 performed in a base station 110. The method aims at receiving acknowledgement information or non-acknowledgement information ACK/NAK from a terminal 120 concerning the reception status of data packets previously sent in a subframe to that terminal 120.

To appropriately send data packets and receive ACK/NAK from the terminal 120 concerning the reception status of the sent data packets, the method may comprise a number of method steps 701-705.

It is to be noted that the method steps 701-705 may be performed in any arbitrary chronological order and that some of them, e.g. step 703 and step 704, or even all steps 701-705 may be performed simultaneously or in an altered, arbitrarily rearranged, decomposed or even completely reversed chronological order. The method may comprise the following steps:

Step 701

Scrambled ACK/NAK is received from the terminal 120.

Step 702

A scrambling code is selected.

Step 703

The received scrambled ACK/NAK is descrambled, using the selected scrambling code.

Step 704

It is determined if the descrambled ACK/NAK comprises an affirmation, confirming that all data packages within the sent subframes have been correctly received by the terminal 120 and that no subframe, expected to be received by the terminal 120, has been missed.

Step 705

The previously sent data packets are resent within the subframes associated with the descrambled ACK/NAK, if it could not be determined that the ACK/NAK comprises an affirmation, confirming a correct reception of all data packages within the sent subframes, and that no subframe, expected to be received by the terminal 120 has been missed.

Figure 8:
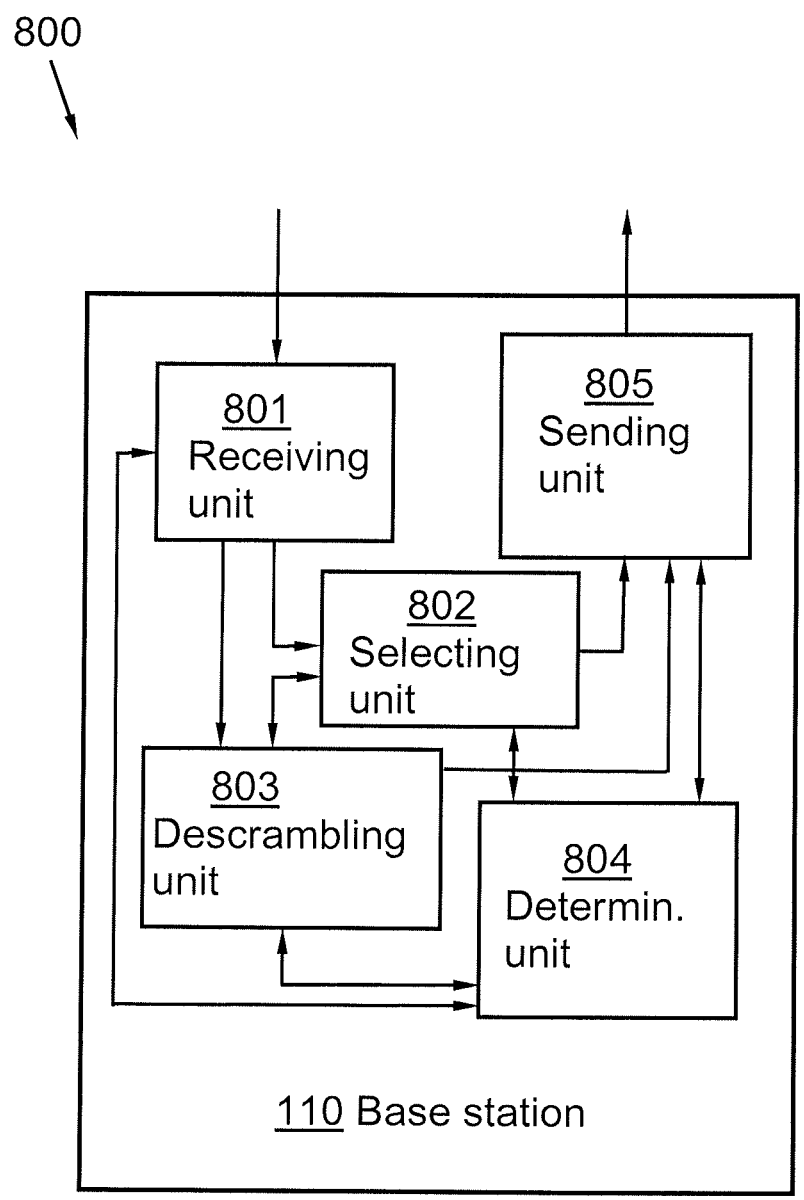
FIG. 8 is a schematic block diagram illustrating embodiments of a base station arrangement.

FIG. 8 schematically illustrates an arrangement 800 in a in a base station 110. The arrangement 800 is adapted to send data packets to a terminal 120. The data packages may be sent e.g. by means of a wireless radio transmission. The terminal 120 may be a mobile terminal such as e.g. a mobile phone. Further, the arrangement 800 is adapted for receiving acknowledgement information or non-acknowledgement information ACK/NAK from a terminal 120 concerning the reception status of data packets previously sent in a subframe to the terminal 120. In addition, the arrangement 800 is adapted to perform the method steps 701-705.

In order to perform the method steps 701-705, the arrangement 800 comprises a plurality of units such as e.g. a receiving unit 801. The receiving unit 801 is adapted to receive scrambled ACK/NAK from the terminal 120. Also, the arrangement 800 further comprises a selecting unit 802. The selecting unit 802 is adapted to select a scrambling code. Additionally, the arrangement 800 also comprises a descrambler 803. The descrambler 803 is adapted to descramble the received scrambled ACK/NAK using the selected scrambling code. Further yet, the arrangement 800 in addition comprises a determination unit 804. The determination unit 804 is adapted to determine if the descrambled ACK/NAK comprises an acknowledgement that all data packages within the sent subframes have been correctly received by the terminal 120 and that no subframe, expected to be received by the terminal 120, has been missed. In addition, the arrangement 800 comprises a sending unit 805. The sending unit 805 is adapted to send and/or resend data packets in a subframe to the terminal 120.

The present mechanism for sending and/or receiving data packets and sending/receiving ACK/NAK acknowledgements may be implemented through one or more processors in the base station arrangement 800 depicted in FIG. 8 or a processor in the terminal arrangement 600 depicted in FIG. 6, together with computer program code for performing the functions of the present solution. The program code mentioned above may also be provided as a computer program product, for instance in the form of a data carrier carrying computer program code for performing the present solution when being loaded into the base station 110 or the terminal 120. One such carrier may be in the form of a CD ROM disc. It is however feasible with other data carriers such as a memory stick. The computer program code can furthermore be provided as pure program code on a server and downloaded to the base station 110 or the terminal 120 remotely.

When using the formulation "comprise" or "comprising" it is to be interpreted as non-limiting, i.e. meaning "consist at least of". The present invention is not limited to the above described preferred embodiments. Various alternatives, modifications and equivalents may be used. Therefore, the above embodiments are not to be taken as limiting the scope of the present invention, which is defined by the appending claims.

The invention claimed is:

1. A method in a terminal for providing acknowledgement or non-acknowledgement (ACK/NAK) information to a base station concerning a reception status of one or more data packets received in one or more subframes from the base station, the method comprising:
generating ACK/NAK information to be sent to the base station;
counting the number of subframes received from the base station;
selecting a scrambling code based on a total number of received subframes;
scrambling the generated ACK/NAK information with the selected scrambling code; and
sending the scrambled ACK/NAK information to the base station.

2. The method of claim 1:
wherein said total number of received subframes comprises a total number of received subframes within a bundling window, the bundling window comprising a plurality of subframes received from the base station;
wherein generating the ACK/NAK information comprises generating the ACK/NAK information to indicate a reception status of data packets received in the bundling window; and
wherein sending the scrambled ACK/NAK information comprises sending the scrambled ACK/NAK information to the base station in a single subframe.

3. The method of claim 1, wherein selection of the scrambling code is further based on the ACK/NAK information to be sent to the base station.

4. The method of claim 1, wherein generating the ACK/NAK information comprises either:
generating ACK information confirming at least one of that all data packets within the received subframes have been correctly received and that no subframe, expected to be received, has been missed; or
generating NAK information confirming at least one of that all data packages within the received subframes have not been correctly received and that at least some subframe, expected to be received, has been missed.

5. The method of claim 1, wherein the scrambling code is an orthogonal code.

6. The method of claim 1:
wherein the received subframes are included in a bundling window; and
wherein the ACK/NAK information is sent concerning all the subframes included within the bundling window.

7. The method of claim 1:
wherein the generated ACK/NAK information concerns a plurality of received subframes; and
wherein said scrambling the generated ACK/NAK information with the selected scrambling code comprises adding the selected scrambling code to the generated ACK/NAK information.

8. The method of claim 1, wherein scrambling the ACK/NAK information with the selected scrambling code comprises adding the selected scrambling code to the generated ACK/NAK information using modulo-2 addition.

9. The method of claim 1, wherein scrambling the ACK/NAK information with the selected scrambling code comprises associating the selected scrambling code with the generated ACK/NAK information using a lookup table.

10. A terminal for providing acknowledgement or non-acknowledgement (ACK/NAK) information to a base station concerning reception status of data packets received in a subframe from the base station, the terminal comprising:
a generating circuit configured to generate ACK/NAK information to be sent to the base station;
a counter circuit configured to count the number of subframes received from the base station;
a selecting circuit configured to select a scrambling code based on a total number of received subframes;
a scrambling circuit configured to scramble the generated ACK/NAK information with the selected scrambling code; and
a sending circuit configured to send the scrambled ACK/NAK information to the base station.

11. The terminal of claim 10:
wherein said total number of received subframes comprises a total number of received subframes within a bundling window, the bundling window comprising a plurality of subframes received from the base station;
wherein the generating circuit is configured to generate the ACK/NAK information to indicate a reception status of data packets received in the bundling window; and
wherein the sending circuit is configured to send the scrambled ACK/NAK information to the base station in a single subframe.

12. The terminal of claim 10, wherein the selecting circuit is configured to select the scrambling code further based on the ACK/NAK information to be sent to the base station.

13. The terminal of claim 10, wherein the generating circuit is configured to either:
generate ACK information confirming at least one of that all data packets within the received subframes have been correctly received and that no subframe, expected to be received, has been missed, or
generate NAK information confirming at least one of that all data packages within the received subframes have not been correctly received and that at least some subframe, expected to be received, has been missed.

14. The terminal of claim 10, wherein the scrambling code is an orthogonal code.

15. The terminal of claim 10:
wherein the received subframes are included in a bundling window; and
wherein the sending circuit is configured to send the ACK/NAK information concerning all the subframes included within the bundling window.

16. The terminal of claim 10:
wherein the generated ACK/NAK information concerns a plurality of received subframes; and
wherein to scramble the generated ACK/NAK information with the selected scrambling code, the terminal is configured to add the selected scrambling code to the generated ACK/NAK information.

17. A method in a base station for receiving acknowledgement information or non-acknowledgement information from a terminal concerning a reception status of one or more data packets previously sent in one or more subframes to the terminal, the method comprising:
- receiving, from the terminal, scrambled information comprising acknowledgement or non-acknowledgement (ACK/NAK) information;
- selecting a scrambling code based on the total number of said subframes that the terminal receives from the base station;
- descrambling the received scrambled ACK/NAK information using the selected scrambling code;
- determining if the descrambled ACK/NAK information comprises acknowledgement information, confirming that all data packets within the sent subframes have been correctly received by the terminal and that no subframe, expected to be received by the terminal, has been missed; and
- if the descrambled ACK/NAK information does not comprise acknowledgement information, resending the data packets associated with said descrambled information.

18. A base station for receiving acknowledgement information or non-acknowledgement (ACK/NAK) information from a terminal concerning a reception status of one or more data packets previously sent in one or more subframes to the terminal, the base station comprising:
- a receiving circuit configured to receive, from the terminal, scrambled ACK/NAK information comprising either acknowledgement information or non-acknowledgement information;
- a selecting circuit configured to select a scrambling code based on the total number of said subframes that the terminal receives from the base station;
- a descrambler circuit configured to descramble the received scrambled ACK/NAK information using the selected scrambling code;
- a determination circuit configured to determine if the descrambled ACK/NAK information comprises acknowledgement information, confirming that all data packets within the sent subframes have been correctly received by the terminal and that no subframe, expected to be received by the terminal, has been missed; and
- a sending circuit configured to resend data packets associated with said descrambled ACK/NAK information to the terminal, if the descrambled ACK/NAK information does not comprise acknowledgement information.

* * * * *